United States Patent
Ikeda

[11] 4,145,117
[45] Mar. 20, 1979

[54] RETROFOCUS TYPE WIDE ANGLE LENS SYSTEM

[75] Inventor: Yoshitsugi Ikeda, Hachiouji, Japan

[73] Assignee: Olympus Optical Co., Ltd., Tokyo, Japan

[21] Appl. No.: 732,182

[22] Filed: Oct. 13, 1976

[30] Foreign Application Priority Data

Oct. 15, 1975 [JP] Japan .................................. 50-123272
Oct. 15, 1975 [JP] Japan .................................. 50-123273

[51] Int. Cl.² .............................................. G02B 9/64
[52] U.S. Cl. .................................................. 350/214
[58] Field of Search ......................................... 350/214

[56] References Cited
U.S. PATENT DOCUMENTS

3,975,091  8/1976  Takahashi ........................... 350/214

FOREIGN PATENT DOCUMENTS

2434007  1/1975  Fed. Rep. of Germany .......... 350/214

*Primary Examiner*—Paul A. Sacher
*Attorney, Agent, or Firm*—Cushman, Darby & Cushman

[57] ABSTRACT

A retrofocus type wide-angle lens system comprising a first positive meniscus lens, a second negative meniscus lens, a third negative meniscus lens, a fourth biconvex lens, a fifth biconcave lens, a sixth positive meniscus lens and a seventh biconvex lens, said lens system having a long back focal length, short total length and being so designed as to favorably correct various aberrations.

10 Claims, 42 Drawing Figures

SPHERICAL ABERRATION

SINE CONDITION

ASTIGMATISM

DISTORTION

SPHERICAL ABERRATION

SINE CONDITION

ASTIGMATISM

DISTORTION

SPHERICAL ABERRATION

SINE CONDITION

ASTIGMATISM

DISTORTION

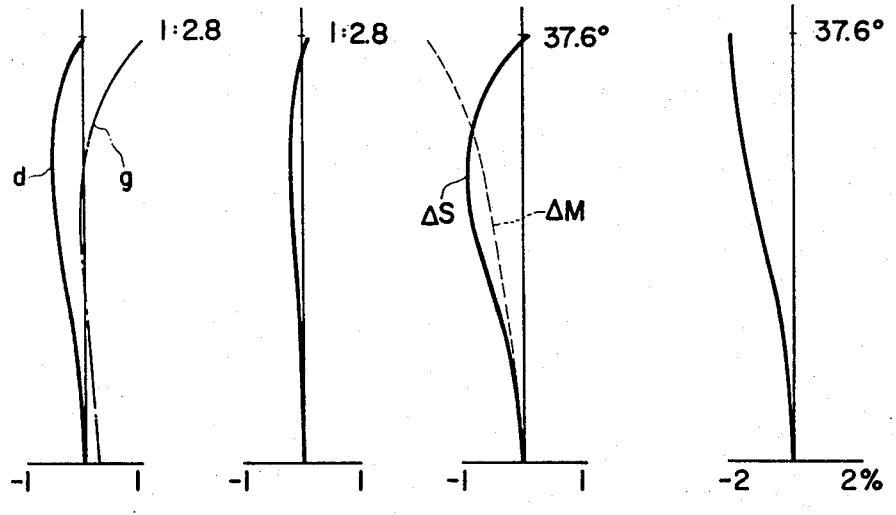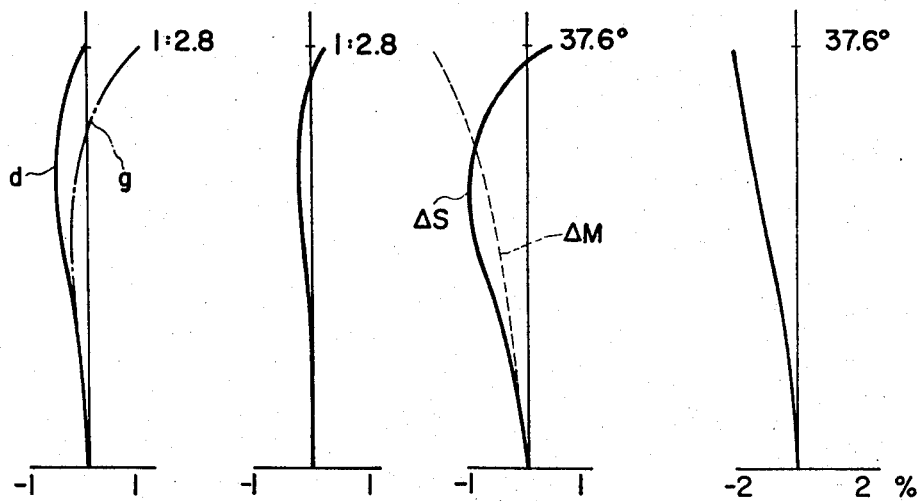

SPHERICAL ABERRATION

SINE CONDITION

ASTIGMATISM

DISTORTION

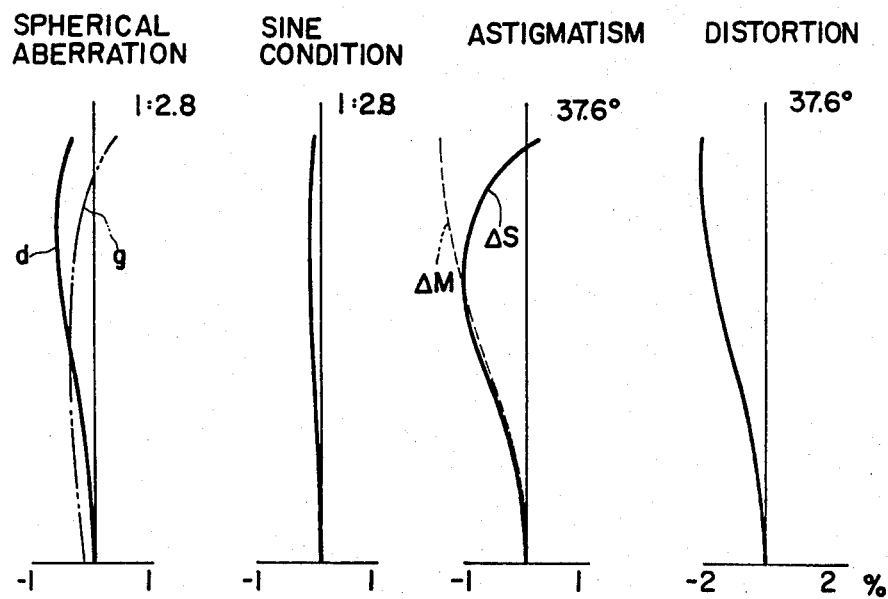
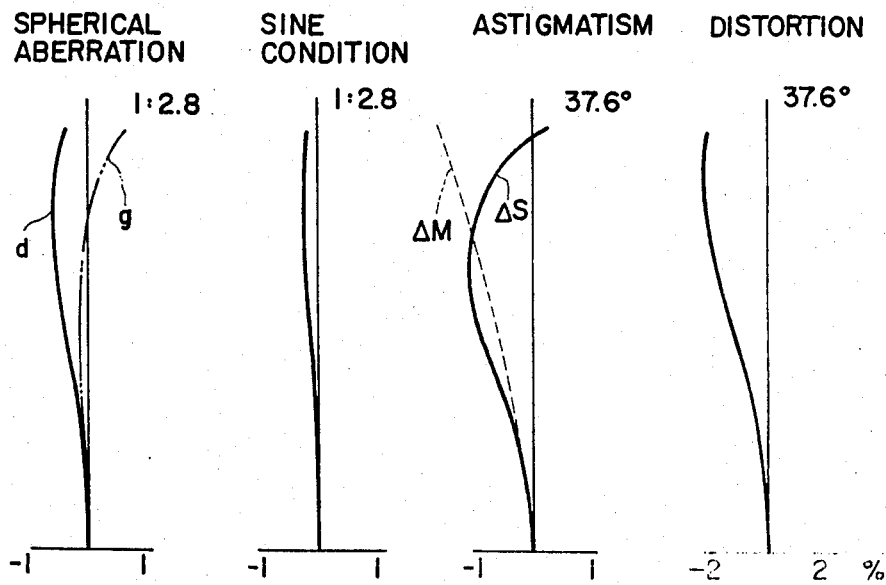

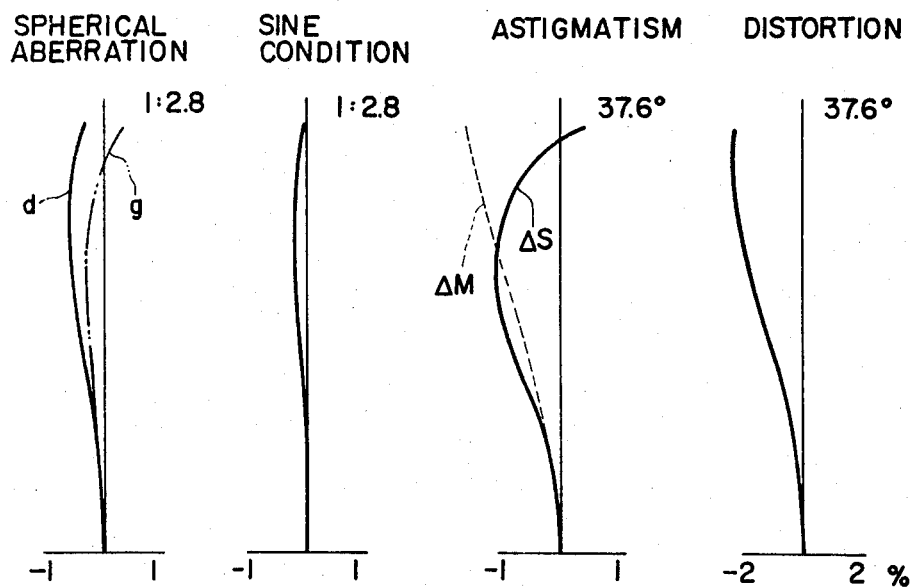
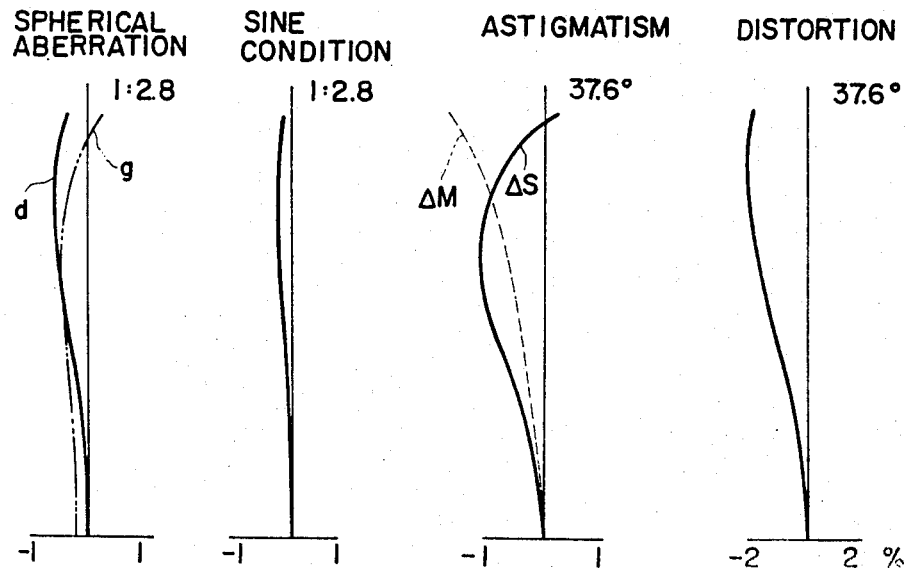

RETROFOCUS TYPE WIDE ANGLE LENS SYSTEM

BACKGROUND OF THE INVENTION (a) Field of the invention:

The present invention relates to a retrofocus type lens system for single-lens reflex camera and more specifically to a lens system having an aperture ratio of 1:2.8, a field angle of 75 degrees or wider and a long back focal length.

(b) Decription of the prior art:

In the conventional retrofocus type wide-angle lens system, a very thick lens component was arranged after a front diversing lens group for favorably correcting aberrations of the lens system. However, such a thick lens component unavoidably increased total length of the lens system. The conventional retrofocus type wide-angle lens system had therefore a drawback that it was long in its total length.

SUMMARY OF THE INVENTION

It is therefore a general object of the present invention to provide a compact retrofocus type lens system which has a long back focal length and a short total length, and wherein astigmatism is corrected sufficiently and balanced well at photographing distances ranging from infinite to short distance.

The lens system according to the present invention comprises, as shown in FIG. 1, a first positive meniscus lens having a convex surface on the object side, a second negative meniscus lens having a convex surface on the object side, a third negative meniscus lens having a convex surface on the object side, a fourth biconvex lens, a fifth biconcave len, a six positive meniscus lens having a concave surface on the object side and a seventh lens having convex surfaces on both sides, and said lens system satisfying the conditions defined below:

(1) $1.6 < r_2/r_3 < 2$
(2) $0.23 < r_4/r_5 < 0.47$
(3) $0.47 < r_6/r_7 < 0.57$
(4) $3.5 < -r_{13}/r_{14} < 8.0, r_{13} < 0$
(5) $0.15f < d_4 < 0.23f$
(6) $0.5f < d_6 < 0.26f$
(7) $0.39f < d_7 < 0.56f$

Wherein, the reference symbols represent as follows:
f: focal length of the entire lens system
$r_2$: radius of curvature on the image side surface of the first lens
  $r_3$ and $r_4$: radii of curvature on both the surfaces of the second lens
  $r_5$ and $r_6$: radii of curvature on both the surfaces of the third lens
    $r_7$: radius of curvature on the object side surface of the fourth lens
    $r_{13}$ and $r_{14}$: radii of curvature on both the surfaces of the seventh lens
$d_4$: airspace between the second and third lenses
$d_6$: airspace between the third and fourth lenses
$d_7$: thickness of the fourth lens Of the conditions mentioned above, the condition (1) is required for defining the shape of the air lens (space located between two lenses and functioning as a lens) between the first and second lenses. When $r_2/r_3$ has a value smaller than the lower limit of the condition (1), it becomes difficult to favorably correct distortion and, in addition, corrective effect for offaxial aberration is reduced since difference in refractive power is minimized between both the surfaces of said air lens. When $r_2/r_3$ exceeds the upper limit of the condition (1), in contrast, it is disadvantageous for keeping a long back focal length and, further, the first lens has a high refractive power, thereby making it necessary to impart high refractive powers to the second and third lenses. The second and third lenses having high refractive power will be undesirable for correcting offaxial aberration favorably.

The conditions (5) and (6) define thickness of the air lens located between the second and third lenses as well as that between the third and fourth lenses. When the upper limits of these conditions are exceeded, the lens system has unavoidably a long total length. For correcting this defect, it is necessary to minimize the thickness $d_7$ of the fourth lens. In this case, however, $d_7$ will unavoidably be smaller than the lower limit defined by the condition (7) and aggravate astigmatism at marginal portions. When $d_7$ exceeds the upper limit of the condition (7), in contrast, it is required to minimize $d_4$ and $d_6$ mentioned above for obtaining a short total length of the lens system. If $d_4$ and $d_6$ are minimized for shortening the total length of the lens system, however, $d_4$ and $d_6$ will become smaller than the lower limits of the conditions (5) and (6) respectively, thereby making it difficult to favorably correct aberrations while keeping a long back focal length. As is understood from the above descriptions, the conditions (5) and (6) are mutually associated with the condition (7) and are required for making it possible to design a compact lens system and correct aberrations in the most balanced conditions.

The conditions (2) and (3) are adopted for equipping surfaces of the second through seventh lenses with refractive powers favorable for offaxial ray when a positive lens is arranged as the first lens so as to satisfy the condition (1). When $r_4/r_5$ and $r_6/r_7$ are smaller than the lower limits of these conditions respectively, spherical aberration and astigmatism are aggravated and cannot be corrected by other lenses. If $r_4/r_5$ and $R_6/r_7$ exceed the upper limits of conditions (2) and (3) respectively, in contrast, the air lenses composed by the surfaces defined by these conditions will have too weak refractive powers, thereby making it impossible to correct spherical aberration and astigmatism in well balanced conditions by the entire lens system. For the reasons described above, it is preferable to select the shapes defined by the conditions (2) and (3) for the air lens located between the second and third lenses as well as that between the third and fourth lenses respectively. Finally, the condition (4) is adopted for defining the shape of the seventh lens, and $r_{13} > 0$ means the fact that the lens has a convex surface on the object side so as to increase positive refractive power on this surface for enhancing effect to correct aberrations. Even when $r_{13}$ is kept within the positive range ($r_{13} > 0$), $-r_{13}/r_{14}$ exceeding the upper limit of the condition (4) or smaller than its lower limit is undesirable since the former will weaken the aforementioned effect and the latter will make the effect too high. Speaking concretely, when $-r_{13}/r_{14}$ exceeds the upper limit of the condition (4), corrective effects are minimized for spherical aberration and astigmatism. When $-r_{13}/r_{14}$ is smaller than the lower limit of the condition (4), in contrast, corrective effects for these aberrations are too strong, thereby making it difficult to properly balance the aberrations and, in addition, to correct distorsion.

The lens system shown in FIG. 7 is compacter than that shown in FIG. 1 since it has shorter total length. For shortening the total length in this manner, the lens system shown in FIG. 7 comprises a fourth lens which has a smaller thickness. In order to design a lens system which comprises such a thin fourth lens and wherein various aberrations are favorably corrected, the air lens located between the first and second lenses as well as the third lens is slightly modified in shape. As is easily understood from FIG. 7, the lens system has a composition similar to that shown in FIG. 1 but is characterized in that it satisfies the conditions (8) through (12) instead of the aforementioned conditions (1) through (7).

(8) $2 < r_2/r_3 < 10$
(9) $1.2 < r_5/r_6 < 1.7$
(10) $1.2 < r_{10}/|r_9| < 2$, $r_9 < 0$
(11) $1 < d_6/d_7 < 1.4$, $d_7 > 0.28f$
(12) $1.65 < n_4 < 1.75$

Wherein the reference symbols represent as follows:
f: total focal length of the entire lens system
$r_2$: radius of curvature on the image side surface of the first lens
$r_3$: radius of curvature on the object side surface of the second lens
$r_5$ and $r_6$: radii of curvature on both the surfaces of the third lens
$r_9$ and $r_{10}$: radii of curvture on both the surfaces of the fifth lens
$d_6$: airspace between the third and fourth lenses
$d_7$: thickness of the fourth lens
$n_4$: refractive index of the fourth lens Of the conditions (8) through (12) mentioned above, the condition (11) defines one of the characteristics of the lens system shown in FIG. 7 that the lens system is so designed as to use a thin fourth lens and be capable of favorably correcting aberrations while keeping a long back focal length of the entire lens system. That is to say, when $d_6/d_7$ has a value smaller than the lower limit of the condition (11), it is impossible to obtain a characteristic that the lens system comprises wide airspaces in combination with the fourth lens which is thin as described above. When $d_6/d_7$ exceeds the upper limit of the condition (11), in contrast, the sine conditions will be undesirable. Further, $d_7$ smaller than 0.28f will make it impossible to favorably correct aberrations while keeping a long back focal length even if $d_6/d_7$ is within the range defined by the condition (11).

The condition (12) defines refractive index of the fourth lens. Even when the fourth lens satisfies the aforementioned condition (11), coma will be aggravated if $n_4$ exceeds the upper limit of the condition (12). If $n_4$ is smaller than the lower limit of the condition (12), in contrast, it sill be undesirable for obtaining proper Petzval's sum. The condition (8) defines the shape of the air lens formed between the first and second lenses. When a thin lens is used as the fourth component as is described above, it is preferable to select a relatively large difference between radii of curvature on both the surfaces of the air lens. If difference in radius of curvature between both the surfaces of the air lens is so small that $r_2/r_3$ has a value smaller than the lower limit of the condition (8), the meridional image surface at intermediate angles will remarkably deviate on the negative side. When difference between $r_2$ and $r_3$ is so large that $r_2/r_3$ exceeds the upper limit of the condition (8), however, image quality will be remarkably degraded at marginal portions. The condition (9) defines the shape of the third lens. $r_5/r_6$ exceeding the upper limit of the condition (9) results in enhancement in negative power, which is advantageous for prolong the back focal length but unavoidably aggravates spherical aberration. When $r_5/r_6$ has a value smaller than the lower limit of the condition (9), negative power will be undesirably low, thereby imposing too heavy a burden on the second lens for keeping a long back focal length. Finally, the condition (10) defines the shape of the fifth lens. The requirement of $r_9 < 0$ in this condition specifies that the fifth lens must be a biconcave lens. If $r_9$ has a positive value, offaxial ray is refracted so largely that it becomes impossible to correct aberrations by the composition of the lens system according the present invention. When $r_{10}/|r_9|$ has a value smaller than the lower limit defined by the condition (10), sagittal image surface will be curved remarkably. If $r_{10}/|r_9|$ exceeds the upper limit, meridional image surface will deviate on the negative side and, in addition, coma will be aggravated.

BRIEF EXPLANATION OF THE DRAWINGS

FIG. 5A through FIG. 5D illustrate graphs showing the aberration characteristics of the Embodiment 4;
FIG. 6A through FIG. 6D illustrate curves showing the aberration characteristics of the Embodiment 5;
FIG. 9A through FIG. 9D show graphs illustrating the aberration characteristics of the Embodiment 7;
FIG. 10A through FIG. 10D illustrate graphs showing the aberration characteristics of the Embodiment 8;
FIG. 11A through FIG. 11D illustrate curves showing the aberration characteristics of the Embodiment 9;
and
FIG. 12A through FIG. 12D show graphs illustrating the aberration characteristics of the Embodiment 10.

DETAILED DESCRIPTION OF THE PREFERRED EMBODIMENTS

Figure 1:
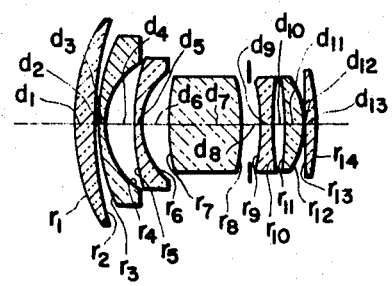
FIG. 1 shows a sectional view illustrating the composition of the Embodiments 1 through 5 of the present invention.
Figure 2A:
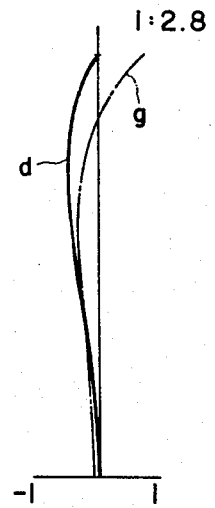
FIG. 2A through FIG. 2D show curves illustrating the aberration characteristics of the Embodiment 1.
Figure 2B:
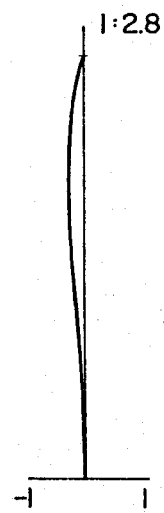
Figure 2C:
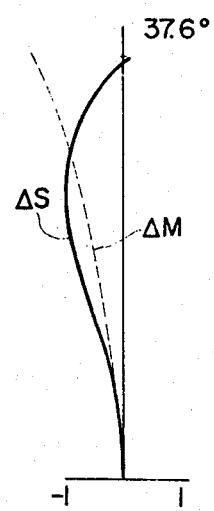
Figure 2D:
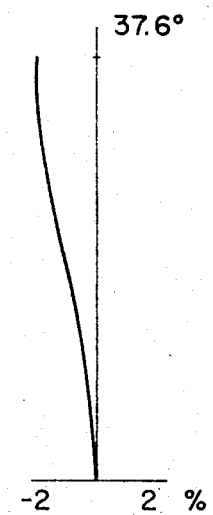
Figure 3A:
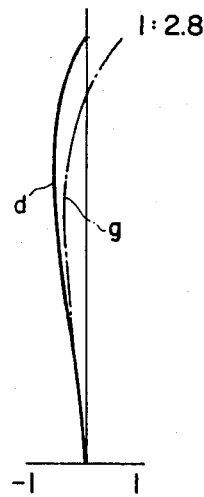
FIG. 3A through FIG. 3D show graphs illustrating the aberration characteristics of the Embodiment 2.
Figure 3B:
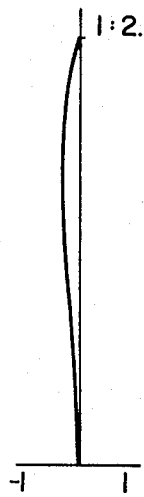
Figure 3C:
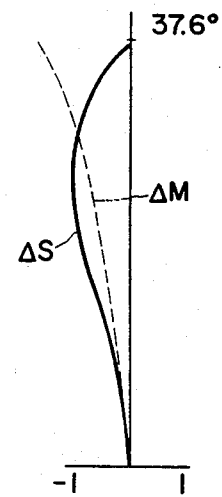
Figure 3D:
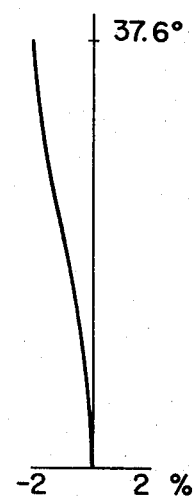
Figure 4A:
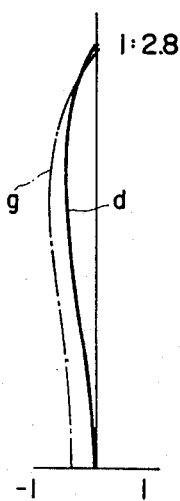
FIG. 4A through FIG. 4D illustrate curves showing the aberration characteristics of the Embodiment 3.
Figure 4B:
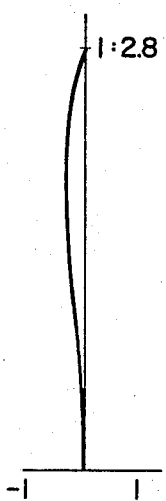
Figure 4C:
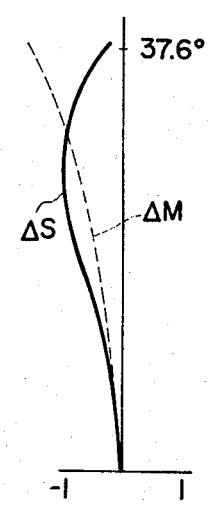
Figure 4D:
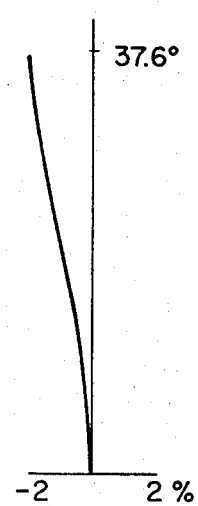
Figure 7:
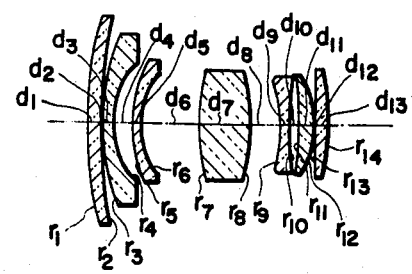
FIG. 7 shows a sectional view illustrating the composition of the Embodiments 6 through 10 of the present invention.
Figure 8A:
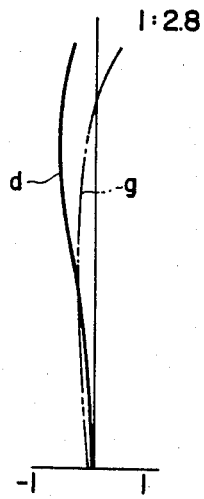
FIG. 8A through FIG. 8D show curves illustrating the aberration characteristics of the Embodiment 6.
Figure 8B:
Figure 8C:
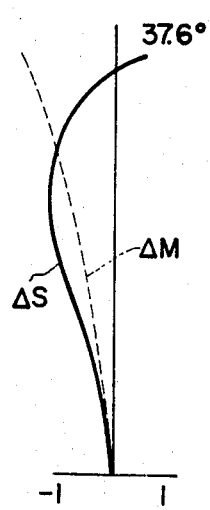
Figure 8D:
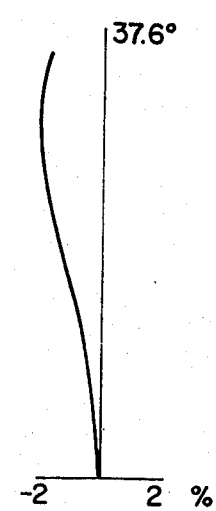

Now, some preferred embodiments of the retrofocus type side angle lens system according to the present invention will be described below:

Embodiment 1

$f = 100$    1 : 2.8 Field Angle 75.3°
$f_B = 134.282$
$r_1 = 103.386$
   $d_1 = 15.18$  $n_1 = 1.66466$  $\nu_1 = 35.8$
$r_2 = 198.802$
   $d_2 = 1.79$
$r_3 = 115.085$
   $d_3 = 4.34$  $n_2 = 1.58913$  $\nu_2 = 61.1$
$r_4 = 43.978$
   $d_4 = 16.15$
$r_5 = 97.732$
   $d_5 = 4.31$  $n_3 = 1.62299$  $\nu_3 = 58.1$
$r_6 = 40.676$
   $d_6 = 18.25$ -continued

Embodiment 1

| | |
|---|---|
| $r_7 = 82.085$ | |
| | $d_7 = 46.71 \quad n_4 = 1.69350 \quad \nu_4 = 50.8$ |
| $r_8 = -87.969$ | |
| | $d_8 = 10.70$ |
| $r_9 = -83.344$ | |
| | $d_9 = 7.44 \quad n_5 = 1.78472 \quad \nu_5 = 25.7$ |
| $r_{10} = 190.721$ | |
| | $d_{10} = 6.61$ |
| $r_{11} = -115.253$ | |
| | $d_{11} = 8.57 \quad n_6 = 1.65844 \quad \nu_6 = 50.9$ |
| $r_{12} = -50.919$ | |
| | $d_{12} = 0.36$ |
| $r_{13} = 513.004$ | |
| | $d_{13} = 8.93 \quad n_7 = 1.62299 \quad \nu_7 = 58.1$ |
| $r_{14} = -121.111$ | |

Embodiment 2

$f = 100 \quad 1 : 2.8 \quad \text{Field Angle } 75.3°$
$f_B = 133.968$

| | |
|---|---|
| $r_1 = 91.816$ | |
| | $d_1 = 15.18 \quad n_1 = 1.66998 \quad \nu_1 = 39.3$ |
| $r_2 = 167.669$ | |
| | $d_2 = 0.54$ |
| $r_3 = 98.884$ | |
| | $d_3 = 4.26 \quad n_2 = 1.62299 \quad \nu_2 = 58.1$ |
| $r_4 = 38.876$ | |
| | $d_4 = 18.25$ |
| $r_5 = 110.985$ | |
| | $d_5 = 4.46 \quad n_3 = 1.58913 \quad \nu_3 = 61.1$ |
| $r_6 = 44.404$ | |
| | $d_6 = 16.14$ |
| $r_7 = 81.144$ | |
| | $d_7 = 44.29 \quad n_4 = 1.69350 \quad \nu_4 = 50.8$ |
| $r_8 = -86.546$ | |
| | $d_8 = 10.65$ |
| $r_9 = -86.496$ | |
| | $d_9 = 7.38 \quad n_5 = 1.78472 \quad \nu_5 = 25.7$ |
| $r_{10} = 182.550$ | |
| | $d_{10} = 6.61$ |
| $r_{11} = -113.424$ | |
| | $d_{11} = 8.57 \quad n_6 = 1.65844 \quad \nu_6 = 50.9$ |
| $r_{12} = -52.363$ | |
| | $d_{12} = 0.36$ |
| $r_{13} = 653.024$ | |
| | $d_{13} = 8.93 \quad n_7 = 1.62299 \quad \nu_7 = 58.1$ |
| $r_{14} = -109.442$ | |

Embodiment 3

$f = 100 \quad 1 : 2.8 \quad \text{Field Angle } 75.3°$
$f_B = 135.964°$

| | |
|---|---|
| $r_1 = 91.653$ | |
| | $d_1 = 15.18 \quad n_1 = 1.66755 \quad \nu_1 = 41.9$ |
| $r_2 = 189.490$ | |
| | $d_2 = 0.54$ |
| $r_3 = 110.137$ | |
| | $d_3 = 4.32 \quad n_2 = 1.62041 \quad \nu_2 = 60.3$ |
| $r_4 = 40.891$ | |
| | $d_4 = 18.45$ |
| $r_5 = 121.979$ | |
| | $d_5 = 4.47 \quad n_3 = 1.58913 \quad \nu_3 = 61.1$ |
| $r_6 = 43.946$ | |
| | $d_6 = 16.52$ |
| $r_7 = 85.922$ | |
| | $d_7 = 53.60 \quad n_4 = 1.69350 \quad \nu_4 = 50.8$ |
| $r_8 = -84.405$ | |
| | $d_8 = 10.66$ |
| $r_9 = -89.844$ | |
| | $d_9 = 7.39 \quad n_5 = 1.78472 \quad \nu_5 = 25.7$ |
| $r_{10} = 200.341$ | |
| | $d_{10} = 6.61$ |
| $r_{11} = -118.636$ | |
| | $d_{11} = 8.57 \quad n_6 = 1.67003 \quad \nu_6 = 47.3$ |
| $r_{12} = -55.683$ | |
| | $d_{12} = 0.36$ |
| $r_{13} = 526.811$ | |
| | $d_{13} = 8.93 \quad n_7 = 1.62299 \quad \nu_7 = 58.1$ |
| $r_{14} = -116.447$ | |

Embodiment 4

$f = 100 \quad 1 : 2.8 \quad \text{Field Angle } 75.3°$
$f_B = 134.643$

| | |
|---|---|
| $r_1 = 108.107$ | |
| | $d_1 = 15.18 \quad n_1 = 1.66998 \quad \nu_1 = 39.3$ |
| $r_2 = 183.814$ | |
| | $d_2 = 0.54$ |
| $r_3 = 96.440$ | |
| | $d_3 = 4.25 \quad n_2 = 1.62299 \quad \nu_2 = 58.1$ |
| $r_4 = 39.523$ | |
| | $d_4 = 18.26$ |
| $r_5 = 110.648$ | |
| | $d_5 = 4.46 \quad n_3 = 1.58913 \quad \nu_3 = 61.1$ |
| $r_6 = 47.323$ | |
| | $d_6 = 16.10$ |
| $r_7 = 83.628$ | |
| | $d_7 = 46.71 \quad n_4 = 1.72000 \quad \nu_4 = 50.3$ |
| $r_8 = -87.641$ | |
| | $d_8 = 10.66$ |
| $r_9 = -81.800$ | |
| | $d_9 = 7.37 \quad n_5 = 1.78472 \quad \nu_5 = 25.7$ |
| $r_{10} = 181.467$ | |
| | $d_{10} = 6.61$ |
| $r_{11} = -115.168$ | |
| | $d_{11} = 8.57 \quad n_6 = 1.65844 \quad \nu_6 = 50.9$ |
| $r_{12} = -53.575$ | |
| | $d_{12} = 0.36$ |
| $r_{13} = 776.916$ | |
| | $d_{13} = 8.93 \quad n_7 = 1.62299 \quad \nu_7 = 58.1$ |
| $r_{14} = -104.038$ | |

Embodiment 5

$f = 100 \quad 1 : 2.8 \quad \text{Field Angle } 75.3°$
$f_B = 134.289$

| | |
|---|---|
| $r_1 = 90.027$ | |
| | $d_1 = 15.18 \quad n_1 = 1.66755 \quad \nu_1 = 41.9$ |
| $r_2 = 173.140$ | |
| | $d_2 = 0.54$ |
| $r_3 = 92.752$ | |
| | $d_3 = 4.40 \quad n_2 = 1.62299 \quad \nu_2 = 58.1$ |
| $r_4 = 39.520$ | |
| | $d_4 = 21.75$ |
| $r_5 = 109.052$ | |
| | $d_5 = 4.65 \quad n_3 = 1.58913 \quad \nu_3 = 61.1$ |
| $r_6 = 49.270$ | |
| | $d_6 = 24.07$ |
| $r_7 = 93.375$ | |
| | $d_7 = 41.21 \quad n_4 = 1.69700 \quad \nu_4 = 48.5$ |
| $r_8 = -89.102$ | |
| | $d_8 = 10.07$ |
| $r_9 = -75.911$ | |
| | $d_9 = 7.35 \quad n_5 = 1.78470 \quad \nu_5 = 26.2$ |
| $r_{10} = 176.357$ | |
| | $d_{10} = 6.61$ |
| $r_{11} = -107.514$ | |
| | $d_{11} = 8.57 \quad n_6 = 1.65844 \quad \nu_6 = 50.9$ |
| $r_{12} = -54.040$ | |
| | $d_{12} = 0.36$ |
| $r_{13} = 394.659$ | |
| | $d_{13} = 8.93 \quad n_7 = 1.62299 \quad \nu_7 = 58.1$ |
| $r_{14} = -102.607$ | |

Embodiment 6

$f = 100 \quad 1 : 2.8 \quad \text{Field Angle } 75.3°$
$f_B = 137.418$

| | |
|---|---|
| $r_1 = 284.087$ | |
| | $d_1 = 9.29 \quad n_1 = 1.66680 \quad \nu_1 = 33.0$ |
| $r_2 = 818.789$ | |
| | $d_2 = 0.36$ |
| $r_3 = 128.262$ | |
| | $d_3 = 4.29 \quad n_2 = 1.62299 \quad \nu_2 = 58.1$ |
| $r_4 = 46.165$ | |
| | $d_4 = 13.78$ |
| $r_5 = 60.464$ | |
| | $d_5 = 5.36 \quad n_3 = 1.62299 \quad \nu_3 = 58.1$ |
| $r_6 = 45.794$ | |
| | $d_6 = 37.86$ |
| $r_7 = 92.730$ | |
| | $d_7 = 29.43 \quad n_4 = 1.72000 \quad \nu_4 = 43.7$ |
| $r_8 = -130.710$ | |
| | $d_8 = 16.98$ |
| $r_9 = -95.122$ | |
| | $d_9 = 3.57 \quad n_5 = 1.78472 \quad \nu_5 = 25.7$ |
| $r_{10} = 128.375$ | |
| | $d_{10} = 5.89$ |
| $r_{11} = -176.667$ | |

-continued

Embodiment 6

$r_{12} = -57.293$
$\quad d_{11} = 7.86 \quad n_6 = 1.62299 \quad \nu_6 = 58.1$
$r_{13} = 590.045$
$\quad d_{12} = 0.36$
$r_{14} = -118.620$
$\quad d_{13} = 8.93 \quad n_7 = 1.63854 \quad \nu_7 = 55.4$

Embodiment 7

$f = 100 \quad 1 : 2.8 \quad \text{Field Angle } 75.3°$
$f_B = 143.053$
$r_1 = 210.115$
$\quad d_1 = 7.36 \quad n_1 = 1.68893 \quad \nu_1 = 31.1$
$r_2 = 430.095$
$\quad d_2 = 0.36$
$r_3 = 116.311$
$\quad d_3 = 4.29 \quad n_2 = 1.62041 \quad \nu_2 = 60.3$
$r_4 = 45.104$
$\quad d_4 = 13.74$
$r_5 = 71.592$
$\quad d_5 = 5.36 \quad n_3 = 1.62041 \quad \nu_3 = 60.3$
$r_6 = 45.916$
$\quad d_6 = 34.24$
$r_7 = 100.638$
$\quad d_7 = 32.98 \quad n_4 = 1.69700 \quad \nu_4 = 48.5$
$r_8 = -117.168$
$\quad d_8 = 18.77$
$r_9 = -102.023$
$\quad d_9 = 3.57 \quad n_5 = 1.76182 \quad \nu_5 = 26.6$
$r_{10} = 142.817$
$\quad d_{10} = 5.89$
$r_{11} = -197.402$
$\quad d_{11} = 7.86 \quad n_6 = 1.62299 \quad \nu_6 = 58.1$
$r_{12} = -57.312$
$\quad d_{12} = 0.36$
$r_{13} = 824.064$
$\quad d_{13} = 8.93 \quad n_7 = 1.63854 \quad \nu_7 = 55.4$
$r_{14} = -127.968$

Embodiment 8

$f = 100 \quad 1 : 2.8 \quad \text{Field Angle } 75.3°$
$f_B = 140.016$
$r_1 = 217.225$
$\quad d_1 = 9.29 \quad n_1 = 1.67270 \quad \nu_1 = 32.1$
$r_2 = 465.216$
$\quad d_2 = 0.36$
$r_3 = 128.801$
$\quad d_3 = 4.29 \quad n_2 = 1.62041 \quad \nu_2 = 60.3$
$r_4 = 48.618$
$\quad d_4 = 13.79$
$r_5 = 68.171$
$\quad d_5 = 5.36 \quad n_3 = 1.62041 \quad \nu_3 = 60.3$
$r_6 = 44.944$
$\quad d_6 = 34.29$
$r_7 = 89.341$
$\quad d_7 = 33.00 \quad n_4 = 1.67003 \quad \nu_4 = 47.3$
$r_8 = -114.823$
$\quad d_8 = 16.96$
$r_9 = -84.118$
$\quad d_9 = 5.36 \quad n_5 = 1.76182 \quad \nu_5 = 26.6$
$r_{10} = 148.701$
$\quad d_{10} = 5.89$
$r_{11} = -184.328$
$\quad d_{11} = 7.86 \quad n_6 = 1.62299 \quad \nu_6 = 58.1$
$r_{12} = -57.666$
$\quad d_{12} = 0.36$
$r_{13} = 1496.363$
$\quad d_{13} = 8.93 \quad n_7 = 1.69680 \quad \nu_7 = 55.5$
$r_{14} = -112.647$

Embodiment 9

$f = 100 \quad 1 : 2.8 \quad \text{Field Angle } 75.3°$
$f_B = 134.813$
$r_1 = 186.201$
$\quad d_1 = 9.29 \quad n_1 = 1.67270 \quad \nu_1 = 32.1$
$r_2 = 314.316$
$\quad d_2 = 0.36$
$r_3 = 118.605$
$\quad d_3 = 4.29 \quad n_2 = 1.62041 \quad \nu_2 = 60.3$
$r_4 = 46.343$
$\quad d_4 = 13.80$ -continued

Embodiment 9

$r_5 = 65.230$
$\quad d_5 = 5.36 \quad n_3 = 1.62041 \quad \nu_3 = 60.3$
$r_6 = 45.804$
$\quad d_6 = 34.31$
$r_7 = 97.289$
$\quad d_7 = 33.01 \quad n_4 = 1.71700 \quad \nu_4 = 47.9$
$r_8 = -111.692$
$\quad d_8 = 16.95$
$r_9 = -89.116$
$\quad d_9 = 5.36 \quad n_5 = 1.76182 \quad \nu_5 = 26.6$
$r_{10} = 140.035$
$\quad d_{10} = 5.89$
$r_{11} = -155.005$
$\quad d_{11} = 7.86 \quad n_6 = 1.62299 \quad \nu_6 = 58.1$
$r_{12} = -56.555$
$\quad d_{12} = 0.36$
$r_{13} = 864.416$
$\quad d_{13} = 8.93 \quad n_7 = 1.69680 \quad \nu_7 = 55.5$
$r_{14} = -123.522$

Embodiment 10

$f = 100 \quad 1 : 2.8 \quad \text{Field Angle } 75.3°$
$f_B = 138.180$
$r_1 = 278.824$
$\quad d_1 = 10.71 \quad n_1 = 1.66680 \quad \nu_1 = 33.0$
$r_2 = 825.707$
$\quad d_2 = 0.36$
$r_3 = 137.645$
$\quad d_3 = 4.29 \quad n_2 = 1.62299 \quad \nu_2 = 58.1$
$r_4 = 48.169$
$\quad d_4 = 13.81$
$r_5 = 64.038$
$\quad d_5 = 5.36 \quad n_3 = 1.62299 \quad \nu_3 = 58.1$
$r_6 = 45.757$
$\quad d_6 = 35.75$
$r_7 = 94.347$
$\quad d_7 = 35.68 \quad n_4 = 1.72000 \quad \nu_4 = 43.7$
$r_8 = -127.738$
$\quad d_8 = 16.88$
$r_9 = -95.728$
$\quad d_9 = 3.57 \quad n_5 = 1.78472 \quad \nu_5 = 25.7$
$r_{10} = 138.197$
$\quad d_{10} = 5.89$
$r_{11} = -165.938$
$\quad d_{11} = 7.86 \quad n_6 = 1.62299 \quad \nu_6 = 58.1$
$r_{12} = -57.784$
$\quad d_{12} = 0.36$
$r_{13} = 537.175$
$\quad d_{13} = 8.93 \quad n_7 = 1.63854 \quad \nu_7 = 55.4$
$r_{14} = -116.911$ Wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

As is understood the embodiments described above, the present invention provides a compact lens system which has an aperture ratio of 1:2.8, a field angle of 75° or wider and a long back focal length, and wherein various aberrations are corrected vary favorably.

I claim:

1. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

```
      f = 100  1 : 2.8  Field Angle 75.3°
        f_B = 134.282
r_1 = 103.386
        d_1 = 15.18  n_1 = 1.66446  ν_1 = 35.8
r_2 = 198.802
        d_2 = 1.79
r_3 = 115.085
        d_3 = 4.34  n_2 = 1.58913  ν_2 = 61.1
r_4 = 43.978
        d_4 = 16.15
r_5 = 97.732
        d_5 = 4.31  n_3 = 1.62299  ν_3 = 58.1
r_6 = 40.676
        d_6 = 18.25
r_7 = 82.085
        d_7 = 46.71  n_4 = 1.69350  ν_4 = 50.8
r_8 = −87.969
        d_8 = 10.70
r_9 = 83.344
        d_9 = 7.44  n_5 = 1.78472  ν_5 = 25.7
r_10 = 190.721
        d_10 = 6.61
r_11 = −115.253
        d_11 = 8.57  n_6 = 1.65844  ν_6 = 50.9
r_12 = 50.919
        d_12 = 0.36
r_13 = 513.004
        d_13 = 8.93  n_7 = 1.62299  ν_7 = 58.1
r_14 = −121.112
``` wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $ν_1$ through $ν_7$ denote Abbe's numbers of the respective lenses.

2. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

```
      f = 100  1 : 2.8  Field Angle 75.3°
        f_B = 133.968
r_1 = 91.816
        d_1 = 15.18  n_1 = 1.66998  ν_1 = 39.3
r_2 = 167.669
        d_2 = 0.54
r_3 = 98.884
        d_3 = 4.26  n_2 = 1.62299  ν_2 = 58.1
r_4 = 38.876
        d_4 = 18.25
r_5 = 110.985
        d_5 = 4.46  n_3 = 1.58913  ν_3 = 61.1
r_6 = 44.404
        d_6 = 16.14
r_7 = 81.144
        d_7 = 44.29  n_4 = 1.69350  ν_4 = 50.8
r_8 = −86.546
        d_8 = 10.65
r_9 = −86.496
        d_9 = 7.38  n_5 = 1.78472  ν_5 = 25.7
r_10 = 182.550
        d_10 = 6.61
r_11 = −113.424
        d_11 = 8.57  n_6 = 1.65844  ν_6 = 50.9
r_12 = −52.363
        d_12 = 0.36
r_13 = 653.024
        d_13 = 8.93  n_7 = 1.62299  ν_7 = 58.1
r_14 = −109.442
``` wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $ν_1$ through $ν_7$ denote Abbe's numbers of the respective lenses.

3. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

```
      f = 100  1 : 2.8  Field Angle 75.3°
        f_B = 134.643
r_1 = 91.653
        d_1 = 15.18  n_1 = 1.66755  ν_1 = 41.9
r_2 = 189.490
        d_2 = 0.54
r_3 = 110.137
        d_3 = 4.32  n_2 = 1.62041  ν_2 = 60.3
r_4 = 40.891
        d_4 = 18.45
r_5 = 121.979
        d_5 = 4.47  n_3 = 1.58913  ν_3 = 61.1
r_6 = 43.946
        d_6 = 16.52
r_7 = 85.922
        d_7 = 53.60  n_4 = 1.69350  ν_4 = 50.8
r_8 = −84.405
        d_8 = 10.66
r_9 = −89.844
        d_9 = 7.39  n_5 = 1.78472  ν_5 = 25.7
r_10 = 200.341
        d_10 = 6.61
r_11 = −118.636
        d_11 = 8.57  n_6 = 1.67003  ν_6 = 47.3
r_12 = −55.683
        d_12 = 0.36
r_13 = 526.811
        d_13 = 8.93  n_7 = 1.62299  ν_7 = 58.1
r_14 = −116.447
``` wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $ν_1$ through $ν_7$ denote Abbe's numbers of the respective lenses.

4. A retrofocus type wide-angle lens sytem comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

```
      f = 100  1 : 2.8  Field Angle 75.3°
        f_B = 134.643
r_1 = 108.107
        d_1 = 15.18  n_1 = 1.66998  ν_1 = 39.3
r_2 = 183.814
        d_2 = 0.54
r_3 = 96.440
        d_3 = 4.25  n_2 = 1.62299  ν_2 = 58.1
r_4 = 39.523
```

-continued $r_5 = 110.648$
$\quad d_4 = 18.26$
$r_6 = 47.323$
$\quad d_5 = 4.46 \quad n_3 = 1.58913 \quad \nu_3 = 61.1$
$r_7 = 83.628$
$\quad d_6 = 16.10$
$r_8 = -87.641$
$\quad d_7 = 46.71 \quad n_4 = 1.72000 \quad \nu_4 = 50.3$
$r_9 = -81.800$
$\quad d_8 = 10.66$
$r_{10} = 181.467$
$\quad d_9 = 7.37 \quad n_5 = 1.78472 \quad \nu_5 = 25.7$
$r_{11} = -115.168$
$\quad d_{10} = 6.61$
$r_{12} = -53.575$
$\quad d_{11} = 8.57 \quad n_6 = 1.65844 \quad \nu_6 = 50.9$
$r_{13} = 776.916$
$\quad d_{12} = 0.36$
$r_{14} = -104.038$
$\quad d_{13} = 8.93 \quad n_7 = 1.62299 \quad \nu_7 = 58.1$ wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

5. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$f = 100 \quad 1 : 2.8 \quad \text{Field Angle } 75.3°$
$f_B = 134.289$
$r_1 = 90.027$
$\quad d_1 = 15.18 \quad n_1 = 1.66755 \quad \nu_1 = 41.9$
$r_2 = 173.140$
$\quad d_2 = 0.54$
$r_3 = 92.752$
$\quad d_3 = 4.40 \quad n_2 = 1.62299 \quad \nu_2 = 58.1$
$r_4 = 39.520$
$\quad d_4 = 21.75$
$r_5 = 109.052$
$\quad d_5 = 4.65 \quad n_3 = 1.58913 \quad \nu_3 = 61.1$
$r_6 = 49.270$
$\quad d_6 = 24.07$
$r_7 = 93.375$
$\quad d_7 = 41.21 \quad n_4 = 1.69700 \quad \nu_4 = 48.5$
$r_8 = -89.102$
$\quad d_8 = 10.07$
$r_9 = -75.911$
$\quad d_9 = 7.35 \quad n_5 = 1.78470 \quad \nu_5 = 26.2$
$r_{10} = 176.357$
$\quad d_{10} = 6.61$
$r_{11} = -107.514$
$\quad d_{11} = 8.57 \quad n_6 = 1.65844 \quad \nu_6 = 50.9$
$r_{12} = -54.040$
$\quad d_{12} = 0.36$
$r_{13} = 394.659$
$\quad d_{13} = 8.93 \quad n_7 = 1.62299 \quad \nu_7 = 58.1$
$r_{14} = -102.607$ wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

6. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$f = 100 \quad 1 : 2.8 \quad \text{Field Angle } 75.3°$
$f_B = 137.418$
$r_1 = 284.087$
$\quad d_1 = 9.29 \quad n_1 = 1.66680 \quad \nu_1 = 33.0$
$r_2 = 818.789$
$\quad d_2 = 0.36$
$r_3 = 128.262$
$\quad d_3 = 4.29 \quad n_2 = 1.62299 \quad \nu_2 = 58.1$
$r_4 = 46.165$
$\quad d_4 = 13.78$
$r_5 = 60.464$
$\quad d_5 = 5.36 \quad n_3 = 1.62299 \quad \nu_3 = 58.1$
$r_6 = 45.794$
$\quad d_6 = 37.86$
$r_7 = 92.730$
$\quad d_7 = 29.43 \quad n_4 = 1.72000 \quad \nu_4 = 43.7$
$r_8 = -130.710$
$\quad d_8 = 16.98$
$r_9 = -95.122$
$\quad d_9 = 3.57 \quad n_5 = 1.78472 \quad \nu_5 = 25.7$
$r_{10} = 128.375$
$\quad d_{10} = 5.89$
$r_{11} = -176.667$
$\quad d_{11} = 7.86 \quad n_6 = 1.62299 \quad \nu_6 = 58.1$
$r_{12} = -57.293$
$\quad d_{12} = 0.36$
$r_{13} = 590.045$
$\quad d_{13} = 8.93 \quad n_7 = 1.63854 \quad \nu_7 = 55.4$
$r_{14} = -118.620$ wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

7. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$f = 100 \quad 1 : 2.8 \quad \text{Field Angle } 75.3°$
$f_B = 143.053$
$r_1 = 210.115$
$\quad d_1 = 7.36 \quad n_1 = 1.68893 \quad \nu_1 = 31.1$
$r_2 = 430.095$
$\quad d_2 = 0.36$
$r_3 = 116.311$
$\quad d_3 = 4.29 \quad n_2 = 1.62041 \quad \nu_2 = 60.3$
$r_4 = 45.104$
$\quad d_4 = 13.74$
$r_5 = 71.592$
$\quad d_5 = 5.36 \quad n_3 = 1.62041 \quad \nu_3 = 60.3$
$r_6 = 45.916$
$\quad d_6 = 34.24$
$r_7 = 100.638$
$\quad d_7 = 32.98 \quad n_4 = 1.69700 \quad \nu_4 = 48.5$
$r_8 = -117.168$
$\quad d_8 = 18.77$ -continued $$r_9 = -102.023$$
$$d_9 = 3.57 \quad n_5 = 1.76182 \quad \nu_5 = 26.6$$
$$r_{10} = 142.817$$
$$d_{10} = 5.89$$
$$r_{11} = -197.402$$
$$d_{11} = 7.86 \quad n_6 = 1.62299 \quad \nu_6 = 58.1$$
$$r_{12} = -57.312$$
$$d_{12} = 0.36$$
$$r_{13} = 824.064$$
$$d_{13} = 8.93 \quad n_7 = 1.63854 \quad \nu_7 = 55.4$$
$$r_{14} = -127.968$$

wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

8. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$$f = 100 \quad 1:2.8 \text{ Field Angle } 75.3°$$
$$f_B = 140.016$$
$$r_1 = 217.225$$
$$d_1 = 9.29 \quad n_1 = 1.67270 \quad \nu_1 = 32.1$$
$$r_2 = 465.216$$
$$d_2 = 0.36$$
$$r_3 = 128.801$$
$$d_3 = 4.29 \quad n_2 = 1.62041 \quad \nu_2 = 60.3$$
$$r_4 = 48.618$$
$$d_4 = 13.79$$
$$r_5 = 68.171$$
$$d_5 = 5.36 \quad n_3 = 1.62041 \quad \nu_3 = 60.3$$
$$r_6 = 44.944$$
$$d_6 = 34.29$$
$$r_7 = 89.341$$
$$d_7 = 33.00 \quad n_4 = 1.67003 \quad \nu_4 = 47.3$$
$$r_8 = -114.823$$
$$d_8 = 16.96$$
$$r_9 = -84.118$$
$$d_9 = 5.36 \quad n_5 = 1.76182 \quad \nu_5 = 26.6$$
$$r_{10} = 148.701$$
$$d_{10} = 5.89$$
$$r_{11} = -184.328$$
$$d_{11} = 7.86 \quad n_6 = 1.62299 \quad \nu_6 = 58.1$$
$$r_{12} = -57.666$$
$$d_{12} = 0.36$$
$$r_{13} = 1496.363$$
$$d_{13} = 8.93 \quad n_7 = 1.69680 \quad \nu_7 = 55.5$$
$$r_{14} = -112.647$$

wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

9. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$$f = 100 \quad 1:2.8 \text{ Field Angle } 75.3°$$
$$f_B = 134.813$$
$$r_1 = 186.021$$
$$d_1 = 9.29 \quad n_1 = 1.67270 \quad \nu_1 = 32.1$$
$$r_2 = 314.316$$
$$d_2 = 0.36$$
$$r_3 = 118.605$$
$$d_3 = 4.29 \quad n_2 = 1.62041 \quad \nu_2 = 60.3$$
$$r_4 = 46.343$$
$$d_4 = 13.80$$
$$r_5 = 65.230$$
$$d_5 = 5.36 \quad n_3 = 1.62041 \quad \nu_3 = 60.3$$
$$r_6 = 45.804$$
$$d_6 = 34.31$$
$$r_7 = 97.289$$
$$d_7 = 33.01 \quad n_4 = 1.71700 \quad \nu_4 = 47.9$$
$$r_8 = -111.692$$
$$d_8 = 16.95$$
$$r_9 = -89.116$$
$$d_9 = 5.36 \quad n_5 = 1.76182 \quad \nu_5 = 26.6$$
$$r_{10} = 140.035$$
$$d_{10} = 5.89$$
$$r_{11} = -155.005$$
$$d_{11} = 7.86 \quad n_6 = 1.62299 \quad \nu_6 = 58.1$$
$$r_{12} = -56.555$$
$$d_{12} = 0.36$$
$$r_{13} = 864.416$$
$$d_{13} = 8.93 \quad n_7 = 1.69680 \quad \nu_7 = 55.5$$
$$r_{14} = -123.522$$

wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

10. A retrofocus type wide-angle lens system comprising a first positive meniscus lens having a convex surface on the object side, a second negative meniscus lens having a convex surface on the object side, a third negative meniscus lens having a convex surface on the object side, a fourth biconvex lens, a fifth biconcave lens, a sixth positive meniscus lens having a concave surface on the object side and a seventh biconvex lens, said lens system having the following numerical data:

$$f = 100 \quad 1:2.8 \text{ Field Angle } 75.3°$$
$$f_B = 138.180$$
$$r_1 = 278.824$$
$$d_1 = 10.71 \quad n_1 = 1.66680 \quad \nu_1 = 33.0$$
$$r_2 = 825.707$$
$$d_2 = 0.36$$
$$r_3 = 137.645$$
$$d_3 = 4.29 \quad n_2 = 1.62299 \quad \nu_2 = 58.1$$
$$r_4 = 48.169$$
$$d_4 = 13.81$$
$$r_5 = 64.038$$
$$d_5 = 5.36 \quad n_3 = 1.62299 \quad \nu_3 = 58.1$$
$$r_6 = 45.757$$
$$d_6 = 35.75$$
$$r_7 = 94.347$$
$$d_7 = 35.68 \quad n_4 = 1.72000 \quad \nu_4 = 43.7$$
$$r_8 = -127.738$$
$$d_8 = 16.88$$
$$r_9 = -95.728$$
$$d_9 = 3.57 \quad n_5 = 1.78472 \quad \nu_5 = 25.7$$
$$r_{10} = 138.197$$
$$d_{10} = 5.89$$
$$r_{11} = -165.938$$
$$d_{11} = 7.86 \quad n_6 = 1.62299 \quad \nu_6 = 58.1$$
$$r_{12} = -57.784$$
$$d_{12} = 0.36$$
$$r_{13} = 537.175$$

-continued $$r_{14} = -116.911 \quad d_{13} = 8.93 \quad n_7 = 1.63854 \quad \nu_7 = 55.4$$

wherein the reference symbol f represents the total focal length of the lens system as a whole, reference symbol $f_B$ designates the back focal length, the reference symbols $r_1$ through $r_{14}$ denote the radii of curvature on the respective lens surfaces, the reference symbols $d_1$ through $d_{13}$ represent thicknesses of the respective lenses and airspaces, the reference symbols $n_1$ through $n_7$ designate refractive indices of the respective lenses and the reference symbols $\nu_1$ through $\nu_7$ denote Abbe's numbers of the respective lenses.

* * * * *